United States Patent [19]
Wolff

[11] 4,336,763
[45] * Jun. 29, 1982

[54] MARINE VESSEL TRANSFER SYSTEM

[76] Inventor: Robert C. Wolff, 955 Crystal St., New Orleans, La. 70124

[*] Notice: The portion of the term of this patent subsequent to May 13, 1992, has been disclaimed.

[21] Appl. No.: 469,807

[22] Filed: May 14, 1974

Related U.S. Application Data

[62] Division of Ser. No. 411,848, Nov. 1, 1973, Pat. No. 3,883,269.

[51] Int. Cl.³ .............................................. B63B 25/08
[52] U.S. Cl. .................................... 114/74 R; 417/122
[58] Field of Search ................ 114/74 R, 74 A, 74 T; 214/15 R, 152; 417/122, 123, 124, 125, 149, 118; 222/373; 414/137, 138, 139, 140

[56] References Cited

U.S. PATENT DOCUMENTS

| | | | |
|---|---|---|---|
| 1,827,925 | 10/1931 | Wolcott | 417/123 |
| 2,120,286 | 6/1938 | Macdonald | 114/74 R |
| 2,669,941 | 2/1954 | Stafford | 222/373 |
| 2,710,586 | 6/1955 | Shelton | 114/74 R |
| 3,005,417 | 10/1961 | Swaney | 417/125 |
| 3,253,746 | 5/1966 | Vreedenburgh | 114/74 R |
| 3,369,716 | 2/1968 | Hulbert | 222/373 |
| 3,527,384 | 9/1970 | Koyama et al. | 114/74 R |

Primary Examiner—Charles E. Frankfort
Attorney, Agent, or Firm—Pravel, Gambrell, Hewitt, Kirk & Kimball

[57] ABSTRACT

An automatic pneumatic pumping system of the type using two or more pumping tanks which are filled in alternate sequence with liquid from a common source and are alternately purged by air pressure so as to effect a continuous and uninterrupted flow of the liquid into a common discharge line, wherein exhaust pumping air is used to create additional head within the liquid supply tanks and the creation of vacuum is used for system and auxiliary use. A preferred application of the system to marine vessels, for example a barge, is described (FIGS. 2-5), along with two special valves, a cargo valve of "top hat" design (FIG. 6) and a cargo inlet feed valve of a two-port wafer type (FIGS. 7A-C).

22 Claims, 9 Drawing Figures

MARINE VESSEL TRANSFER SYSTEM

This is a division of application Ser. No. 411,848 filed Nov. 1, 1973, entitled "LIQUID TRANSFER SYSTEM", now U.S. Pat. No. 3,883,269.

BACKGROUND OF THE INVENTION

The present invention relates to an automatic pneumatic pumping system of the type using two or more pumping tanks which are filled in alternate sequence with liquid from a common source and are alternately purged by for example air pressure or other pumping fluid so as to effect a continuous and uninterrupted flow of the liquid into a discharge line and relates to its revolutionary application to marine vessels, e.g. barges, which carry liquid, slurry and certain dry types of bulk cargo. It should be understood that the term "pneumatic" as herein used includes all types of pumping fluids or gases and not just compressed air and the term "liquid" includes slurries and the like.

Basic Pumping System

Broadly speaking, pneumatic pumping systems of the general type of the present invention are known and have been established for use in other limited applications; typical examples of the prior art being shown in the patents to Ellis (U.S. Pat. No. 2,145,540 issued Jan. 31, 1939), Oliphant (U.S. Pat. No. 1,783,747 issued Dec. 2, 1930) and Long (U.S. Pat. No. 3,405,648 issued Oct. 15, 1968). However, such prior art pneumatic pumping systems generally have lacked the broader capabilities and flexibility desired. The present invention by utilizing inter alia the exhaust pumping air to create additional head within the liquid supply tanks and by utilizing the created vacuum for system and auxiliary use has, it is believed, greatly improved and advanced these general types of pneumatic pumping systems.

Barge Embodiment

Transportation of cargoes of liquid, slurry or dry types of bulk cargo on barges on inland waterways and rivers and on sea-going barges, as well as ships, has been and still is the cheapest form of transportation. For this reason alone these forms of transportation have grown and will continue to grow in meeting requirements.

However, their continuing growth has not been accompanied by corresponding improvements in various items of important equipment in general use on barges and ships. There is much room for more efficient, safer and cleaner performance of mission by better solutions to many existing problems, and it is in this area that the present invention is directed. Examples of some of the problems to which the present invention directs itself are as follows:

1. The conventional piping system and valves in general use for emptying cargo tanks carrying liquids and slurries make it impossible to get all the cargo out, that is, the cargo tanks cannot be completely emptied. Unsatisfactory results include:
    a. Over-carry of cargo, causing contamination of the next cargo.
    b. Required cleaning of cargo tanks before they are ready for new cargo.
    c. Empty-condition trip to cleaning facility ashore, which are few and far between, and empty-condition trip to next loading point.
    d. Expense of cleaning operation.
    e. Loss of active time of equipment and personnel during cleaning job.
    f. Accumulation of rust in cargo tanks of older barges causes many problems, including great difficulty in gas-freeing.

2. The conventional pumps in general use in marine vessels are of centrifugal, rotary or reciprocating type, and they are attended by problems of safety, maintenance and reliability, including:
    a. Moving parts wear in service and, in case of some cargoes, are subject to erosion and clogging.
    b. Shaft glands and seals of centrifugal and rotary pumps present problems other than normal maintenance; they are known to heat up in operation, thus creating hazards when flammable or otherwise dangerous cargoes are being handled. Gland leaks from all types of conventional pumps present similar hazards.
    c. The repair and servicing of diesel driven pumps on barges is an awkward operation, introducing safety hazards, particularly where flammable or otherwise dangerous cargoes are being handled.

3. The conventional diesel engine power source on each barge is attended by problems and undesirable features, including:
    a. It is an expensive item of equipment and its infrequent use is attended by problems of reliability and maintenance.
    b. The high temperature exhaust and accompanying sparks create safety hazards when flammable cargoes are being handled.
    c. It is heavy and its removal would allow more cargo to be carried.

While all the problems and hazards indicated above will not be completely solved by the present invention, a number will be eliminated and the remainder will be in great measure reduced. In addition there are other advantages and capabilities of the present invention that will become evident as its detailed description and operation are developed.

For example, several hazardous procedures on barges are eliminated by the present invention. It is common practice to open the deck manhole covers on cargo tanks during the unloading operation. For safety purposes, it is required that a 30-mesh or two 20-mesh screens be placed over such open manholes. However, as the cargo tanks approach the near empty condition, the practice is to remove the screens in order to watch the level of cargo in the tanks. The hazards of removing the screens are considered less than the hazards that will develop if the conventional diesel driven centrifugal pump is allowed to continue in operation past the empty condition, since air will be drawn into the pump. The effect of operating the pump when air is being drawn into it is to produce cavitation, a highly undesirable condition that causes the pump to heat up, along with other adverse mechanical effects. Accordingly, when a whirlpool is seen developing around the suction of the pump, it is shut off. Obviously, vapors from cargo in the tanks are free to escape to the atmosphere whenever the manholes are open, with or without the screens in place. Thus, when flammable or otherwise dangerous cargoes are being pumped, hazardous conditions prevail due to the conditions described. These difficulties do not occur in the present invention, because the manhole covers can always be kept closed when a barge is equipped with the present invention. There is no need to open the manhole covers since the present invention automatically cuts off when the cargo tanks are empty. Thus, furthermore, environmental pollution due to escape of cargo vapors is reduced by keeping the manholes closed, a consideration that becomes particularly important when cargoes with various odors, such as aromatic fuels, atrilanol, carbon tetrachloride, ethyl acrylate and acrylonitrile, etc., are involved. In addition, the hazardous pump and diesel engine drive, which account for part of the risks and hazards described, are eliminated.

Particular objectives of the present invention, particularly in its marine embodiment, include:

1. Complete emptying of cargo tanks as a routine operation.
2. Safer transfer and transportation of cargoes.
3. More efficient transfer of cargoes.
4. Reduction of cargo and environmental pollution.
5. On-board capability of easily cleaning cargo tanks.
6. Improved capability for handling viscous cargoes.
7. On-board means for safely and conveniently evacuating bilges.
8. Improved cargo heating system.
9. Built-in means for thorough clean-out of pumping system on completion of pumping operations.
10. More cargo capacity through weight reductions.
11. Additional tow boat fuel capacity, for example 10 to 15 tons per barge in tow, thus reducing critical tow boat draft.
12. Improved and safer cargo loading.
13. Elimination of duplicate pumping systems for handling more than one type of cargo.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 3 is a partial, plan view of the marine embodiment of FIG. 2 of the present invention; while FIG. 4 is an end, cross-sectional view taken along section lines 4—4 of FIG. 3 of the marine embodiment, looking aft; while

FIG. 7A is a side, partial cross-sectional view, with some of the elements partially cut away, of the special cargo inlet feed valve of two-port wafer design used in the cargo pumping tanks of the preferred marine embodiment of the pumping system of the present invention; while

DESCRIPTION OF THE PREFERRED EMBODIMENTS

Introduction

The operation of the basic pumping system of the present invention will be described and traced with reference to FIG. 1, and, later, a preferred embodiment of the basic system with modification and improvements as adapted for a new use on barges and ships will be described and traced in detail with reference to FIGS. 2-5.

Basic Pumping System

Figure 1:
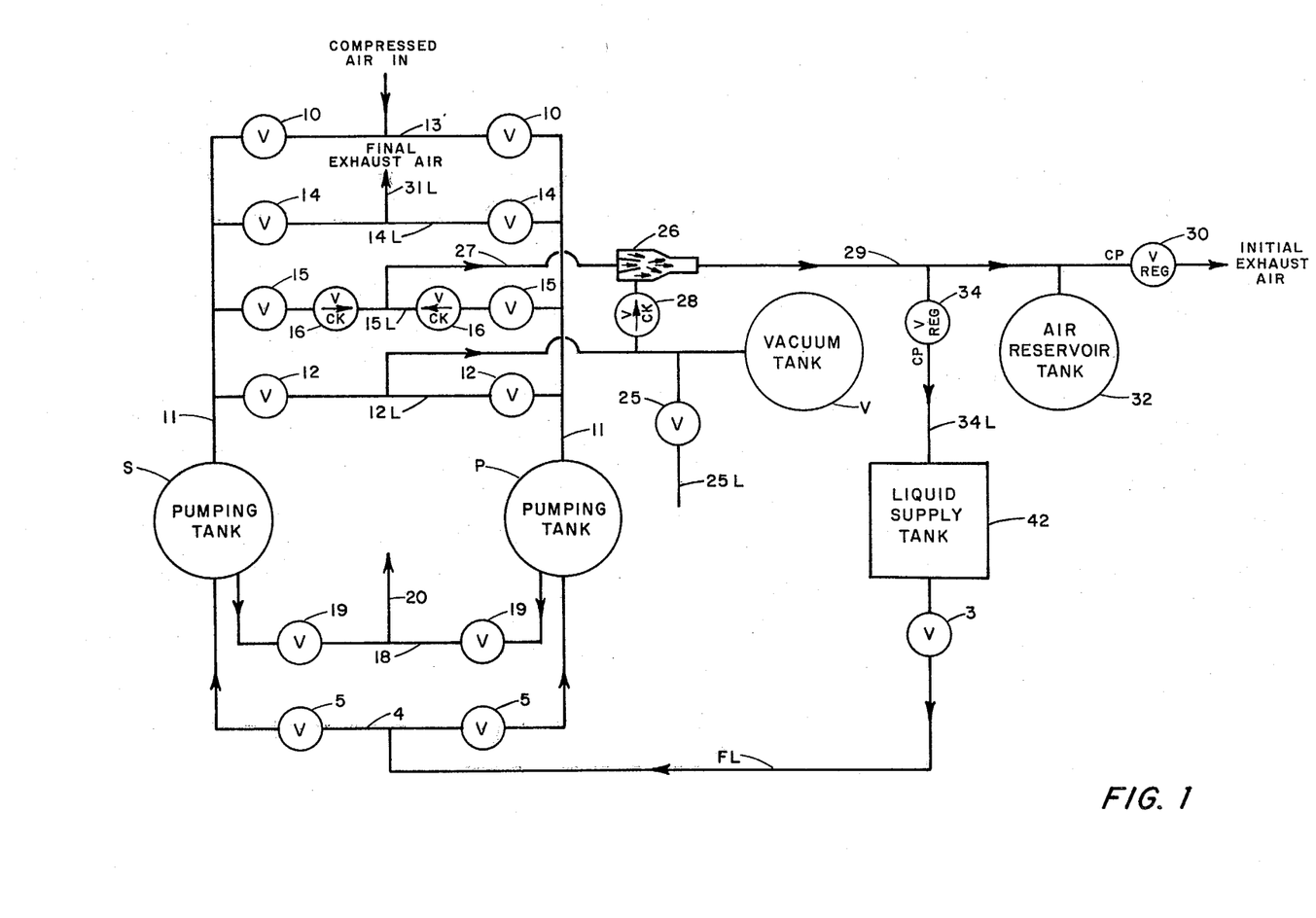
FIG. 1 is a schematic illustration of the preferred embodiment of the basic pumping system of the present invention.

Referring to FIG. 1, the basic system consists of for example two pumping tanks P and S, connected together by line 4 which is further connected by liquid feed line FL to the bottom of the liquid supply tank 42. Flow from the liquid supply tank is hand controlled by liquid feed valve 3, while flow into the pumping tanks is automatically controlled by liquid inlet valves 5, one for each pumping tank, between line 4 and the pumping tanks P and S.

An automatic control system causes the required opening and closing of various valves in proper sequence to effect the alternate filling and discharging of liquid by the pumping tanks, that is, the cycle of operation. This control system may be of special design or one of several standard types available; for example it may be electrically or mechanically operated and triggered either by level sensors within the pumping tanks or by a time cycle controller or by both.

Other components of the system, their function and operation, will become clear as the cycle of operation is described. Starting with liquid inlet valve 5 for pumping tank P having just closed, tank P now being full of liquid, the pumping fluid, e.g. compressed air, is supplied through line 13 and its admission to pumping tank P is automatically controlled by air inlet valve 10. The inlet air passes through line 11, and the liquid in tank P is purged out of the bottom of the tank through discharge line 18 and on through check valve 19 to the common discharge line 20.

The control system closes valve 10 to cut off the supply of purging air before the tank has been completely emptied. This action is followed closely by automatic opening of initial exhaust valve 15 which permits the exhaust air from tank P to escape through line 11 into initial exhaust line 15L which is further connected to line 27. The passage of the initial exhaust air through line 27 and on through jet pump or aspirator 26, which is connected to vacuum tank V through check valve 28, produces a vacuum of for example twenty-odd inches of mercury in vacuum tank V.

On leaving jet pump or aspirator 26 the initial exhaust air passes along line 29 to an initial exhaust air reservoir tank 32 where the air pressure is maintained at for example five lbs. per sq. inch by pressure control valve 30 in line 29. Also connected to tank 32 is pressure control valve 34 which reduces the pressure of the exhaust air it passes to twelve oz. per sq. inch as it continues on through line 34L to the liquid supply tank 42. The effect in the liquid supply tank is to increase the static head in the tank by twelve oz. per sq. inch, about one foot eight inches additional head, which increases the rate of flow of liquid from the tank and assists in complete emptying of the tank, both important features when viscous liquids are involved.

This particular exemplary pressure of twelve oz. per sq. in. is the maximum allowed in some tanks, barges and ships in particular, by certain pressure-vacuum valves, a required permanently installed safety feature on such cargo tanks, not explicitly shown in FIG. 1. Should the initial exhaust air pressure in line 29 exceed five lbs. per sq. inch, the excess is released to the atmosphere by pressure control valve 30. The actions just described followed the automatic opening of initial exhaust valve 15 which is shortly followed by automatic opening of final exhaust air valve 14. This latter action admits the final exhaust air, of lower pressure, into line 14L which is open to the atmosphere through line 31L.

A second means of producing vacuum can be provided by direct admission of compressed air from line 13 to siphon 26 by an appropriate direct connection (not illustrated).

Returning to the cycle of operation, the automatic opening of final exhaust valve 14 is followed shortly by the automatic opening of liquid inlet valve 5 for tank P, permitting the tank to fill with liquid after which valve 5 is automatically closed and the cycle for tank P is completed. The same sequence of operations described for pumping tank P also takes place in pumping tank S but so timed by the automatic control system that, while tank P is filling, tank S is discharging and a continuous and uninterrupted flow of liquid is produced. The cycle of operation can be slowed down or speeded up by adjustment of the automatic control system; however, other factors such as air compressor capacity, size of piping and viscosity of liquid being pumped affect speed of operation.

Regarding uses of the vacuum produced, vacuum tank V is directly connected to line 12L which is further connected through stop valve 12 to the common air inlet and exhaust line 11 to pumping tanks P and S. This permits the use of vacuum in the pumping tanks, an arrangement that is useful toward the end of pumping operations, particularly when handling viscous or very valuable liquids, for pulling the last of the liquid into the pumping tanks. Line 12L is also connected through stop valve 25 to line 25L. This permits use of the vacuum as a suction pump without the complexities of an independent power drive and the attendant hazards when handling flammable liquids.

The present invention is adaptable for use in a number of different embodiments, all of which would utilize the same basic system and principles of the present invention but with appropriate changes in layout, piping, etc. as required. For example, on ships of the tanker type with their deep tanks and separate pump rooms, the safe pumping system of the present invention could well replace much of the hazardous pump room equipment.

Various applications of the basic system would include inter alia the following:

1. Use on present and future inland waterway, river and seagoing barges.
2. Use on present and future ships such as oil tankers and other types.
3. Use on present and future pusher type tug boats and other types of tug boats as additional or replacement auxiliary machinery.
4. Use as an independent water-borne pumping unit, with or without its own motive power.
5. Use as an independent land-borne pumping unit, with or without its own motive power.

The most preferred embodiment or application is in item 1 above, that is, the invention as adapted with modifications and improvements to present and future barges for inland waterway, river and seagoing service, and such an application will be described more fully below.

Barge Embodiment

In the preferred embodiment for use on barges, the most active components of the system are located in the barge pump room which is usually near the forward end of the barge. The room extends across the barge, averaging for example about 35 ft. width, 13 ft. depth and 5 ft. along the length of the barge.

Referring to FIGS. 2, 3, 4, and 5, two cylindrical pumping tanks P and S (for port and starboard) lie horizontally across the barge, in-line and near the bottom of the pump room. Each pumping tank can be for example about 30 inches in diameter and 13 ft. long. Flanged spool piece 4 connects tanks P and S together and contains other flanged openings to receive cargo through feed lines FL. In barges having no center line bulkhead dividing the cargo tanks, only one feed line of larger size is used. In general, the cycle of operation and the automatic control system is similar to that described earlier for the basic system.

Figure 4:
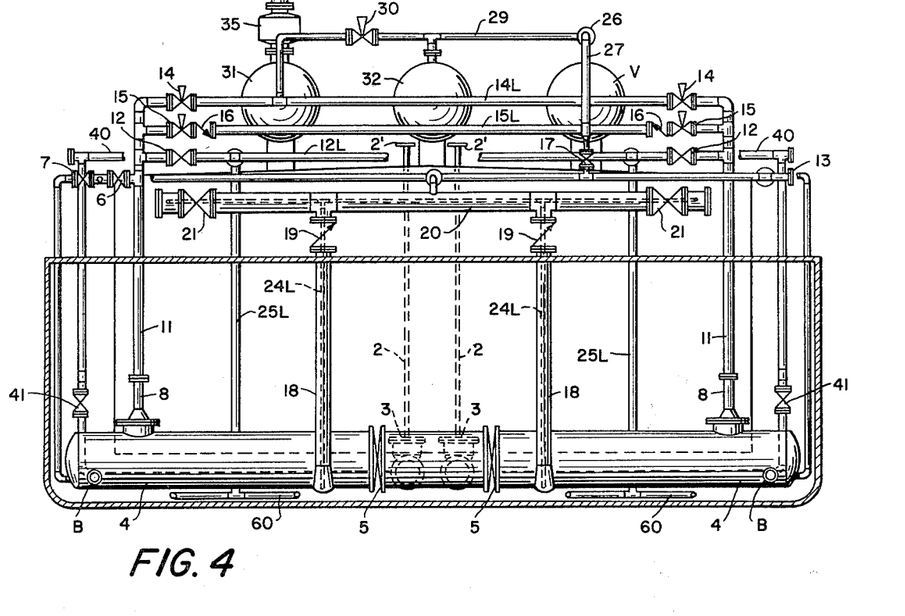
Figure 5:
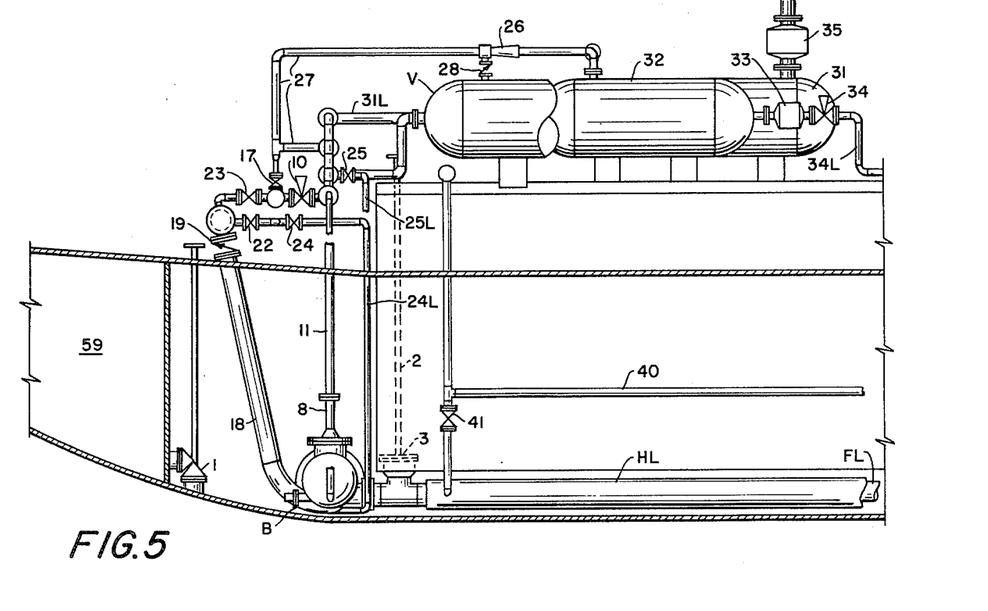
FIG. 5 is a partial, side, cross-sectional view, taken along section lines 5—5 of FIG. 3, of the port side of the marine embodiment.
Figure 6:
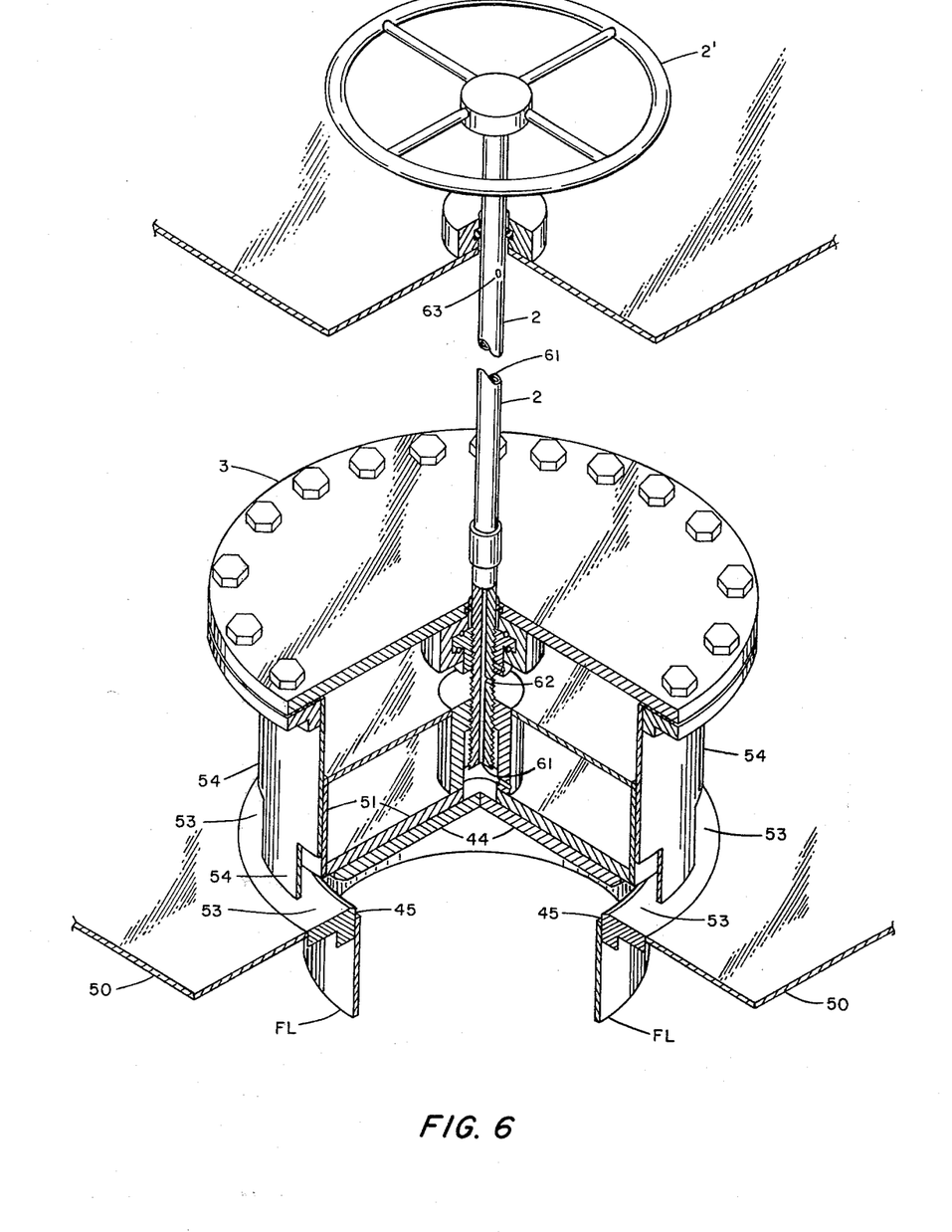
FIG. 6 is a perspective, cross-sectional view of the special cargo valve of "top hat" design used in the cargo tank in the preferred marine embodiment of the present invention.

The cargo feed valves 3, as shown in FIG. 6, are located in the bottom 50 of each cargo tank and are of special "top-hat" design to assure complete emptying of all cargo. These valves can be for example about twenty inches in diameter and are hand operated from deck by means of hand wheels 2' and attached reach rods 2, as shown in FIGS. 4, 5 and 6. Where desirable, reach rods 2 may be encased to reduce friction. In the open position, ports or cut-aways 53 of large size in the bottom of the outer cylindrical "top-hat" 54 permit free flow of cargo into feed line FL, as shown in FIG. 6. Opening or closing the valve by rotating the hand wheel 2' and attached reach rod 2 raises or lowers the inner cylindrical piston 51, to which the seating disc 44 is attached. Reach rod 2 is provided with a hollow center flow line 61 which includes a bottom orifice 62 and a top orifice 63, all of which allows any fluid trapped above the inner cylindrical piston 51 to be expelled out the top orifice 63 into the cargo tank. The amount of vertical travel can be for example about five inches. The seating surface may be chamfered metal-to-metal as shown, and/or an enlarged diameter disc grooved for a resilient O-ring near the perimeter may be used to form a tight seal against the seat flange 45 shown. Vertical guides, not shown, prevent the inner piston 51 from rotating with respect to the outer housing 54 as the hand wheel 2' and reach rod 2 are rotated.

Figure 7A:
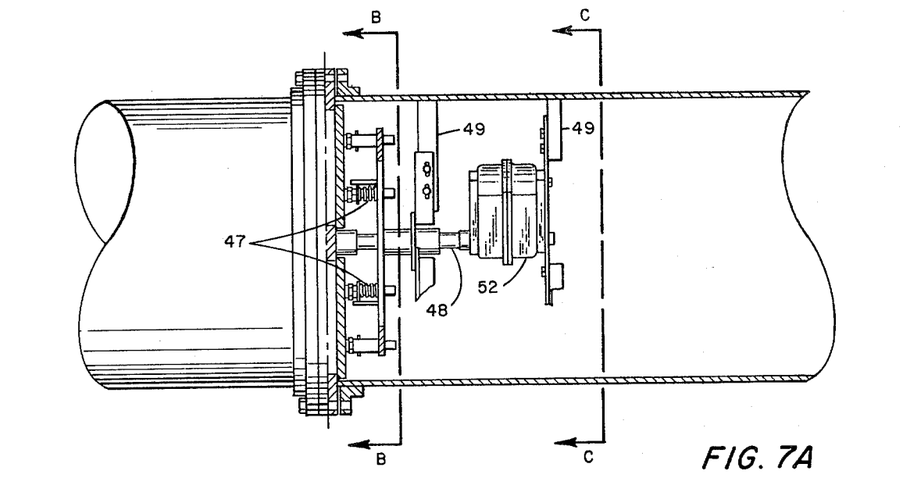
Figure 7B:
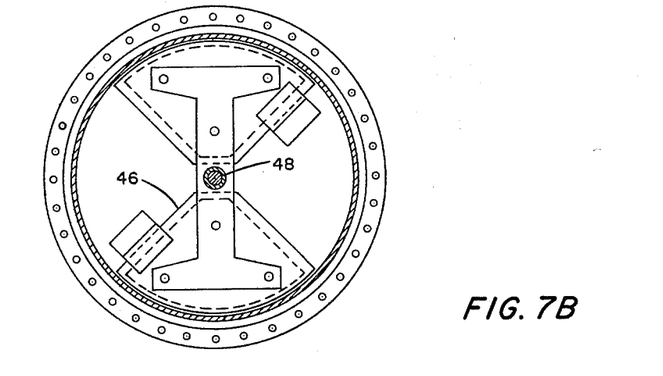
FIGS. 7B and 7C are end, cross-sectional views of the cargo inlet feed valve of FIG. 7A, taken along section lines B—B and C—C, respectively, of FIG. 7A.
Figure 7C:
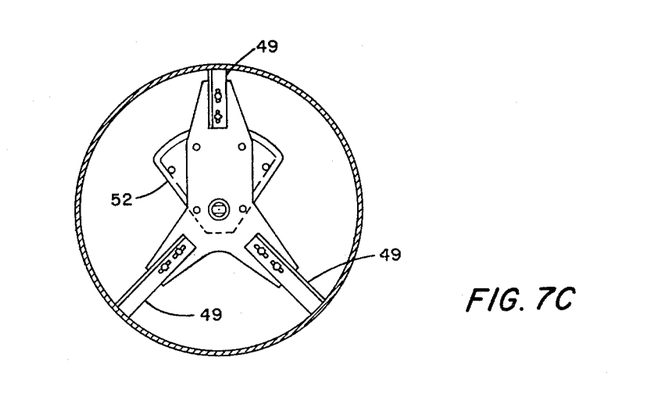

The cargo inlet valve 5 within each of the pumping tanks is also be of special design. FIGS. 7A-C show details of these valves which can be for example about thirty inches in diameter and can be of for example a two-port wafer type as illustrated or otherwise, as desired. The valves 5 can for example be installed in the flanged circumferential connection between the pumping tanks and spool piece 4, thus affording good fastening and easy access to the valve and its automatic air actuator 52. Full opening or closing of the two-port design illustrated requires ninety degrees of rotation of the wafer 46; both operations being so timed in the cycle that minimum pressure is on the valve 5. Steel springs 47, shown in FIG. 7A, exert a constant pressure in line with the pumping pressure for holding the valve on its seat. The air actuator 52 and the drive shaft 48 are supported by sets of trunions 49. The active seating parts or surfaces of the valve that experience wear in normal operation can be reversed to bring fresh unworn surfaces into action, thus prolonging the life of the valve.

Figure 2:
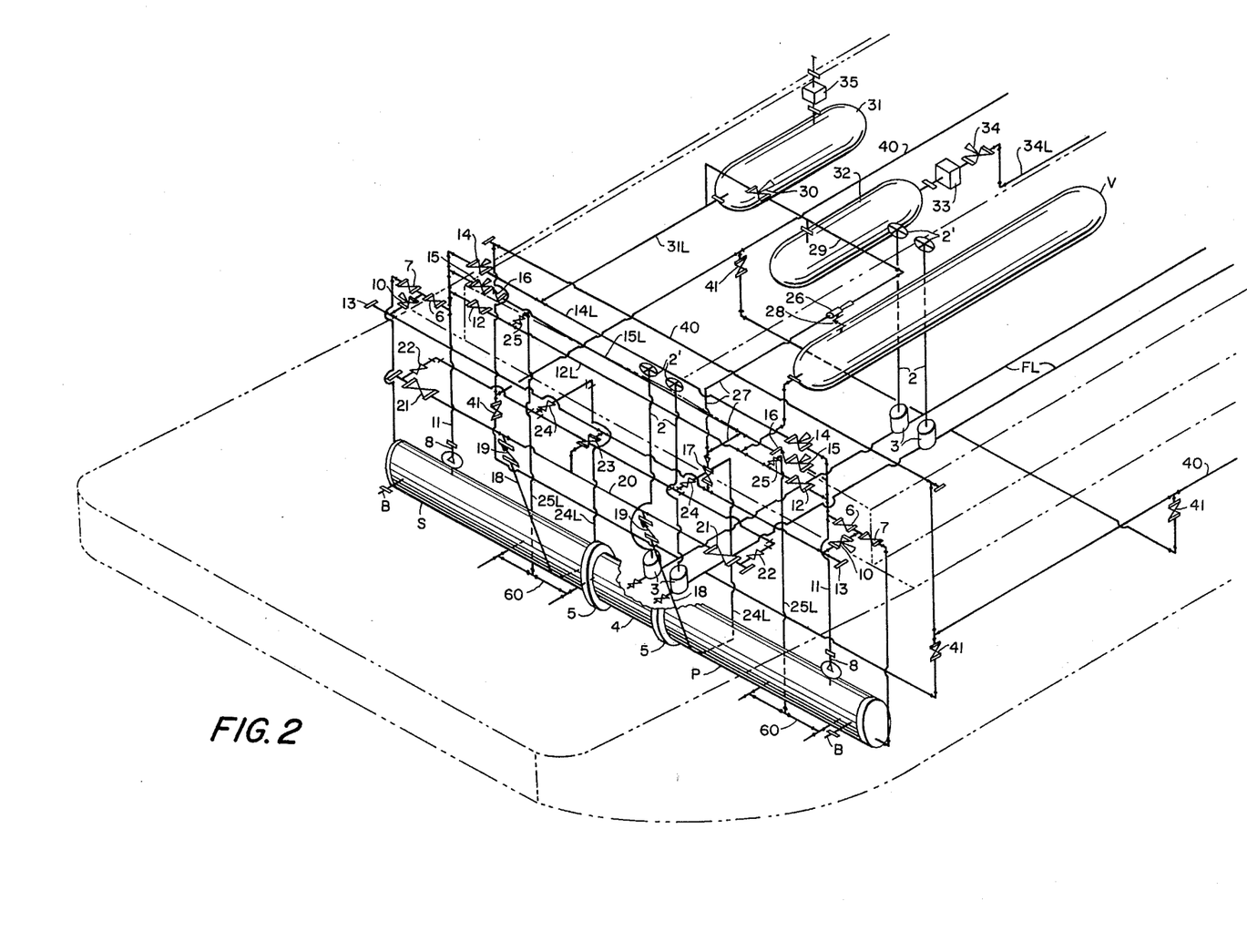
FIG. 2 is an isometric view of the preferred marine embodiment of the present invention showing the layout of the elements of the pumping system, many schematically illustrated, with the general out-line of the barge vessel shown in phantom lines.
Figure 3:
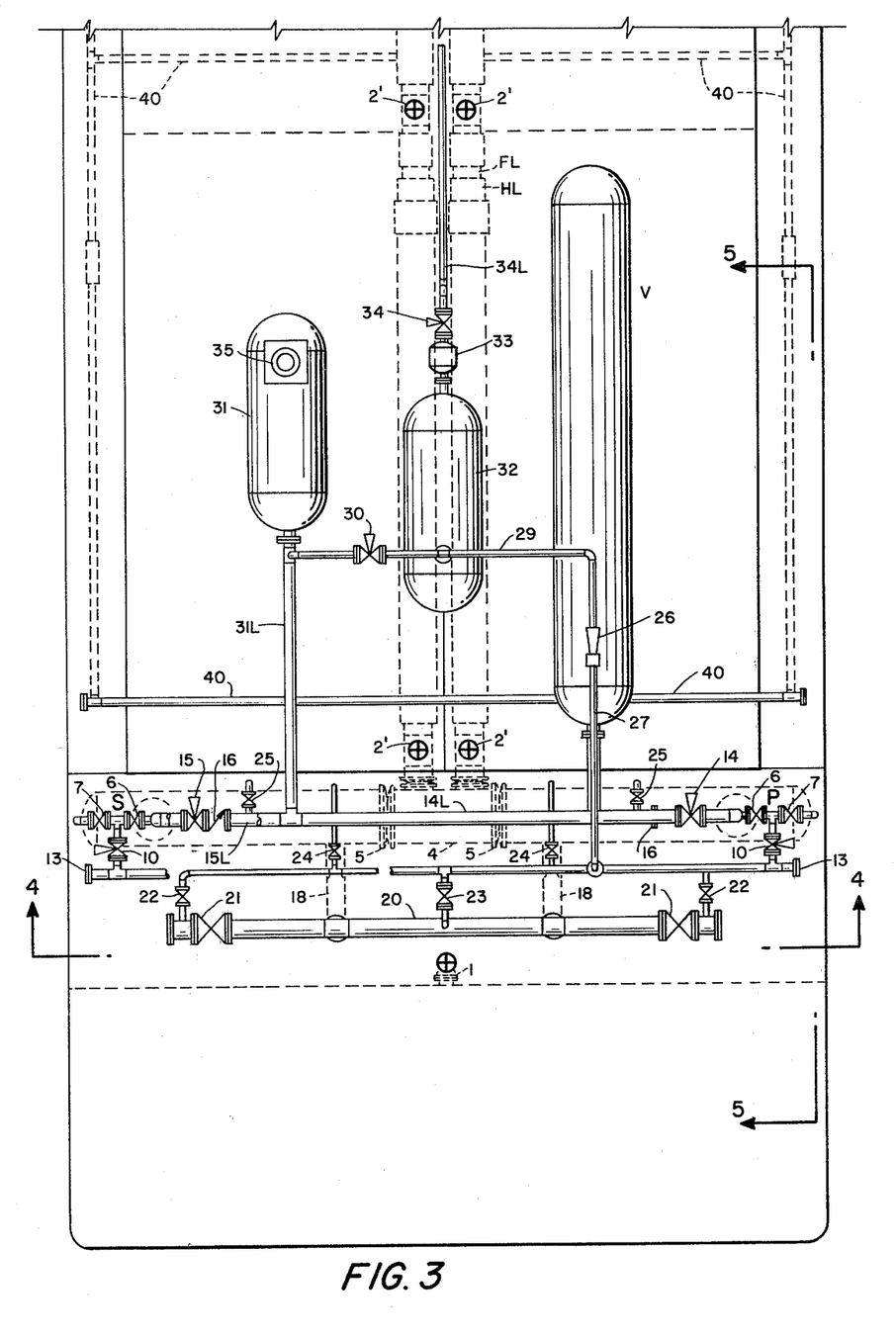

The cargo feed lines FL can be of for example fourteen inch size and are enclosed by for example a concentric sixteen inch steam heating line or jacket HL, as shown in FIGS. 3 and 5. Steam for heating viscous cargoes is supplied through line 40 and controlled by hand stop valves 41 to each cargo tank, as shown in FIGS. 2, 3 and 5. Additional heating capacity, if needed, is available through separate heating coils, not shown but available as a standard item of equipment. Since the energy for heating cargo is lost, no more heating should be done than that necessary to make the cargo pumpable. Rather than heat all the cargo in the tanks, the heating system illustrated has been designed to heat only the cargo being pumped. This reduced heating is particularly important when the cargo is oil and the like, because over-all heating of such a cargo causes the "light ends" to evaporate first which are the most dangerous and volatile part of the cargo; with such a cargo the less heating the better. Where desirable, as in the case of asphalt and other such cargoes, the pumping tanks P and S may be jacketed for introduction of heat to assure free movement of the inlet cargoes valves 5.

The present invention has demonstrated marked advantages over conventional pumps in handling viscous products or products that become viscous in low ambient temperatures. For example, during a test in the case of heavy lubricating oil (Bright Stock) for making greases, the amount of heating necessary to make the cargo flow was much less than would be required with conventional pumps. In fact, the cargo from the pumping tanks was still so viscous as to resemble sausage as it was discharged.

Large savings in fuel required for heating of many cargoes are accomplished by the use of the improved and more efficient heating system of the present invention as compared with the prior art. For example, a two hundred foot barge with thirty-five foot beam loaded with 10,000 bbls. or about 1600 tons of "bunker C" oil at a temperature of 40° F. would commonly be heated to 125° F. or higher to be handled by the present conventional pumps. The amount of fuel used for this heating would be about eighty bbls., considering that only about half the heat content of the fuel goes into raising the temperature of the oil. Utilizing the present invention, less than half this amount of fuel would be required.

In tracing the details of the cycle of operation, an operating rate of four complete cycles per minute will be assumed as exemplary and reference is made to FIGS. 2, 3, 4 and 5. Starting with pumping tank P having just reached the near empty or cut-off stage in the cycle, the automatic control system (ACS) actuates the closing of air inlet valve 10 for tank P. About one half second later the ACS acts to open the initial exhaust air valve 15 for tank P. Following this action by about one second, the ACS causes the final exhaust air valve 14 for tank P to open. Next and about one second later, the ACS actuates the cargo inlet valve 5 inside tank P causing it to open for about four seconds, thus admitting cargo to fill tank P. At the end of the four second period, the ACS causes the cargo inlet valve 5 to close and, about one second later, the compressed air inlet valve 10 to tank P to open. The latter action admits compressed air through line 11 and stop valve 6 to tank P which causes the cargo to be purged out through the bottom of the tank into cargo discharge line 18 and on through check valve 19 to the common cargo header line 20 on deck. From the cargo header line the cargo can be directed to port or starboard by use of stop valves 21. The elapsed time from the near empty or cut-off stage to the time when tank P has been filled and compressed air admitted is seven-and-a-half seconds. This leaves seven-and-a-half seconds for the purging operation, or a total of fifteen seconds to finish the cycle. The sequence of operations described for tank P also takes place in tank S but so timed by the ACS that while tank P is filling tank S is emptying and a continuous and uninterrupted flow of cargo is produced. The complete cycle for both tanks occurs, at the rate assumed, every fifteen seconds or four times a minute which would result in a pumping rate of about 3500 barrels an hour.

When the cargo tanks have been emptied, means for automatically cutting off the system are provided. Although the pumping tanks are never completely emptied during normal operation, they will become empty at the end of pumping operations when the cargo tanks are finally empty. This condition in the pumping tanks actuates sensing element B (note FIGS. 4 and 5) at the bottom of each pumping tank. This causes the ACS to close the compressed air inlet valve 10 to both pumping tanks and to open the initial and final exhaust valves 14 and 15 for both pumping tanks.

The normal route for compressed air inlet and exhaust is through common air inlet and exhaust line 11, passing through stop valve 6 and inspection spool 8. However, when handling slurry cargoes, the air inlet is routed through stop valve 7 and enters near the bottom of the pumping tanks for improved operation. The exhaust air still passes out through line 11 and inspection spool 8.

As described for the basic system, an exemplary vacuum of twenty-odd inches of mercury is created in vacuum tank V by the initial exhaust air, and an exemplary air pressure of five lbs. per sq. in. is maintained in tank 32 by pressure control valve 30 in line 29. From this point on changes are introduced in the manner of handling the exhaust air for the barge embodiment as compared to the basic system.

A connection to tank 32 permits exhaust air to pass through flame screen 33 and on through pressure control valve 34 which reduces the pressure of the air it passes to twelve oz. per sq. in. as it continues on into line 34L. This line leads to the cargo tanks where the effect is to increase the static head in these tanks by about one foot eight inches, which assists in complete emptying of the cargo tanks and, in case of viscous cargoes, further assists their movement from the tanks. Again, as described for the basic system, pressure-vacuum valves limit the air pressure in the tanks to an exemplary twelve oz. per sq. in. Should the pressure in tank 32 exceed five lbs. per sq. in., pressure control valve 30 in line 29 releases the excess through line 31L to scrubber tank 31. This tank serves to remove moisture and particulate matter from the exhaust air before it is discharged to the atmosphere through flame screen 35. Flame screens 35 and 33 are both designed to provide easy access for inspection and, if necessary, cleaning. Final exhaust air valve 14 opens automatically shortly after initial exhaust valve 15 and the final exhaust air passes through line 14L directly to scrubber tank 31, where the action is as before.

Also, as described for the basic system, vacuum may be produced by direct admission of compressed air from line 13 to jet pump or aspirator 26 by opening stop valve 17 and admitting the air through line 27. In addition to the uses of vacuum described for the basic system, an important use on barges is in evacuating the bilges. Barges in service commonly have one to four or more inches of bottom sediment, oil and water in their bilges.

In the prior art the job of getting the bilges cleaned out is such that generally it is not done until the barge goes in for cleaning at shore facilities where the job still involves hazards and difficulties. For example, a man has to go down underneath the double bottoms at several locations with a suction hose. The space is so restricted and dangerous that a thorough job is doubtful.

However, the vacuum available with the present invention in conjunction with a permanently installed small pipe system 60, an extension of line 25L, (note FIGS. 2 & 4), to the actual low points in the bilges will not only do the job easily, thoroughly and without hazards, the barge will be able to carry more cargo and the oil from the bilges can be reclaimed. Additionally, in case of leakage of cargo into the bilges of barges equipped with this invention, the reclaiming of such cargo is facilitated since the bilges will be clean and dry and the bilge evacuation system will easily recover the cargo.

The unfortunate consequences associated with conventional barge and ship practices, such as expense of cleaning cargo tanks at shore facilities, loss of equipment and personnel time, empty trips and cargo pollution, will be largely solved by complete emptying of cargo tanks which this invention is designed to do and will accomplish. It is recognized, however, that some cleaning of cargo tanks will be necessary after some types of cargo have been carried and before some other types of cargo should be loaded.

The present invention is well adapted for use as an on-board built-in tank cleaning system to meet this problem. The cleaning procedure, type of solvent used and other details will vary with the product to be cleaned from the tanks. Whatever method is required, this invention lends itself well to a procedure whereby cargo tanks are cleaned. When the cargo tanks have been cleaned, the cleaning solution is taken out by the pumping tanks and stored in either the scrubber tank 31, the exhaust air tank 32 or the vacuum tank V, where it is held for reclaiming or other disposition.

Another advantage of the three tanks on the deck of each barge—the scrubber tank 31, the exhaust air tank 32 and the vacuum tank V—lies in their use for additional tow boat fuel capacity. Tow boats may use an average of about 350 tons of fuel per voyage, however, the limiting draft of the tow boat is sometimes a problem. This problem is eased with ten to fifteen tons of fuel (or lubricating oil) in the three tanks on the deck of each barge. In addition, more fuel capacity permits advantages in buying fuel. Of course, the planning of the voyage and fuel used must be such that the three tanks on the deck of each barge are available for system use when and as desired.

The procedure for starting the pumping system of the present invention in operation, assuming that a barge full of cargo of one type is at the dock starboard side to and ready to be unloaded, would be as follows. Referring to FIGS. 2, 3, 4 and 5, all stop valves in the system are closed. The sea cock 1, shown in FIG. 5, is opened; this admits water to the forward ballast tank 59 (note FIG. 5), causing some increase in draft of the barge forward where the pump room is located. The cargo valves 3 in all cargo tanks are opened through the use of hand wheels 2' and reach rods 2 on deck. The stop valve 6 in air inlet and exhaust line 11 is opened to both pumping tanks. The starboard stop valve 21 in cargo header line 20 on deck is opened to direct discharging cargo in the desired direction. The automatic control system (ACS) is actuated by push bottom and compressed air is admitted to air line 13. The system will then automatically start operation. When the forward ballast tank 59 is full, seacock 1 is closed until the cargo is unloaded. Unlike the prior art with conventional pumps and possible malfunctioning relief valves that may result in excessive pressures, should a discharge valve be closed accidentally or intentionally, the pressure that can be built up at any point cannot exceed the relatively lower input pumping pressure of the present invention.

When pumping operations are finished, a means of cleaning out the pumping system is provided. Compressed air is admitted through stop valve 23 to the cargo header line 20 on deck with stop valves 21 in closed position. Check valves 19 in cargo discharge lines 18 are secured in open position, which permits the compressed air to thoroughly blow out any remnants of cargo through the bottom of discharge lines 18 and on out through line 24L and stop valves 24 into line 22L, where it passes out through stop valve 22 to the final cargo discharge line.

Some present barges which handle more than one type cargo are equipped with two or more diesel engines and pumps. Such duplications would be unnecessary for barges equipped with the present invention since thorough cleanout of the system after handling each type cargo is easily accomplished.

Loading of liquid cargoes on present barges is usually accomplished through a permanently installed loading line on the deck of the barge from which the cargo experiences a free fall as it drops into the cargo tanks. This introduces some hazards, particularly in the case of flammable or otherwise dangerous cargoes. For barges equipped with the present invention the cargo will be loaded through lines 20, 18 and FL with hand control by means of stop valves 21, and individual cargo tank feed valves 3. No free fall is involved and there is no need for a loading line on the deck of the barge.

The operation of the present invention is quiet and unstrained as it smoothly delivers large volumes of cargo. In addition to the advantages and capabilities already described, barges and ships equipped with this system have an expanded usefulness and versatility in meeting a wider variety of missions. The efficiency and reliability of the air purging operation as compared to conventional pump systems with their frictional, mechanical and energy losses is clear. Many hazards of conventional systems are eliminated without introduction of new hazards. Environmental pollution is reduced by elimination of the diesel engine exhaust from each barge and by a clean system that also provides for handling and keeping normal pollutants aboard the vessel.

As is true with most mechanical systems and in particular one such as the present invention which includes piping, valving, tanks and the like, the number of variations and modifications of the embodiments described in exemplary detail are nearly limitless. For example, a closed pumping system using an inert fluid such as nitrogen rather than compressed air might be used; or, in the handling of crude oil in oil fields where natural gas under pressure is available, the present invention may profitably utilize this gas as the pumping fluid before it is commonly burned for disposal.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A marine vessel for transporting and transferring material in a liquid or slurry form comprising:
   (a) a hull;
   (b) at least one cargo tank for storing the material in said hull; and
   (c) a material transfer system connected to said cargo tank for transferring the material out of said cargo tank; said material transfer system comprising -
   (i) at least two pumping chambers;
   (ii) a common discharge line for said pumping chambers;
   (iii) material inlet means connected between said cargo tank and said pumping chambers for alternately filling said pumping chambers with the material to be transferred;
   (iv) material outlet means connected between said pumping chambers and said common discharge line for alternately transferring the material from said pumping chambers to said common discharge line;
   (v) fluid pressure head means connected to said pumping chambers for supplying a pumping fluid pressure head to said pumping chambers for forcing the material out of said pumping chambers;
   (vi) fluid exhaust line means connected to said pumping chambers for exhausting the pumping fluid pressure head from the pumping chambers after the material has been forced out of them;
   (vii) cargo tank fluid line means connected between said exhaust line means and the cargo tank for increasing the static pressure head in said cargo tank; whereby the rate of flow of the material to said pumping chambers is increased and complete emptying of the cargo tank is enhanced; and
   (viii) control means connected to said pumping chambers for controlling said inlet means, said outlet means, said fluid pressure head means and said fluid exhaust line means in proper sequence; whereby the material can be transferred from the vessel's cargo tank(s) without all the problems and hazards found in the transfer systems for marine vessels used in the prior art.

2. The marine vessel of claim 1 wherein there is further included:
   exhaust fluid reservoir means connected to said fluid exhaust line means and said cargo tank fluid line means for building up and holding a certain pressure level; said exhaust fluid reservoir means comprising a fluid reservoir tank, a pressure control valve, an outlet to atmosphere, and lines connecting said reservoir tank to and between said outlet to atmosphere through said pressure control valve and said fluid exhaust line means and said cargo tank fluid line means; whereby a constantly available source of fluid pressure is available to said cargo tank for maintaining a fluid pressure head therein.

3. The marine vessel of claim 2 wherein said cargo tank fluid line means includes pressure control valve means for reducing the pressure of the fluid coming into it.

4. The marine vessel of claim 2 wherein there is further included:
   supplemental fluid exhaust line means, separate from said first recited fluid exhaust line means, connected from said pumping chambers to atmosphere, said first recited fluid exhaust line means serving as an initial exhaust line for exhausting the pumping fluid pressure head during each cycle of operation.

5. The marine vessel of claim 2 wherein there is further included:
   scrubber tank means connected between said exhaust fluid reservoir tank and said outlet to atmosphere through a pressure control valve for removing moisture and particulate matter from the exhaust fluid before it is discharged to the atmosphere.

6. The marine vessel of claim 2 wherein there is further included flame screens in the lines between said exhaust fluid reservoir tank to said outlet to atmosphere and to said cargo tank.

7. The marine vessel of claim 1 wherein there is further included:
   vacuum tank means connected to said pumping chambers for producing a vacuum in said pumping chambers for pulling the last of the material to be transferred into said pumping chambers.

8. The marine vessel of claim 1 wherein the marine vessel is a barge and wherein said pumping chambers are at least generally cylindrical in shape and are placed horizontally athwart said hull.

9. The marine vessel of claim 8 wherein said pumping chambers are placed axially in line athwart said hull, one on the port side and the other on the starboard side.

10. The marine vessel of claim 9 wherein said pumping chambers are located near the end of the barge hull, between it and the cargo tank; and wherein there is further included within the barge hull:
    a ballast tank located between said pumping chambers and said end of the barge hull; whereby when said ballast tank is filled, the draft of the barge is increased near and toward said pumping chambers.

11. The marine vessel of claim 8 wherein there is further included:
    exhaust fluid reservoir means connected to said fluid exhaust line means and said cargo tank fluid line means for building up and holding a certain pressure level; said exhaust fluid reservoir means comprising a fluid reservoir tank, a pressure control valve, an outlet to atmosphere and lines connecting one side of said reservoir tank to atmosphere through said pressure control valve and the other side to said fluid exhaust line means and said cargo tank fluid line means; whereby a constantly available source of fluid pressure is available to said cargo tank for maintaining a fluid pressure head therein; and
    vacuum tank means including a vacuum tank connected to said pumping chambers for producing a vacuum in said pumping chambers for pulling the last of the material to be transferred into said pumping chambers; said fluid reservoir tank and said vacuum tank being located topside on the deck of the barge.

12. The marine vessel of claim 1 wherein there is further included:
heating means positioned around said material inlet means for heating the material to be transferred.

13. A marine vessel for transporting and transferring material in a liquid or slurry form comprising:
(a) a hull;
(b) at least one cargo tank for storing the material in said hull; and
(c) a material transfer system connected to said cargo tank for transferring the material out of said cargo tank; said material transfer system comprising—
(i) at least two pumping chambers;
(ii) a common discharge line for said pumping chambers;
(iii) material inlet means connected between said cargo tank and said pumping chambers for alternately filling said pumping chambers with the material to be transferred;
(iv) material outlet means connected between said pumping chambers and said common discharge line for alternately transferring the material from said pumping chambers to said common discharge line;
(v) fluid pressure head means connected to said pumping chambers for supplying a pumping fluid pressure head to said pumping chambers for forcing the material out of said pumping chambers;
(vi) fluid exhaust line means connected to said pumping chambers for exhausting the pumping fluid pressure head from the pumping chambers after the material has been forced out of them; said fluid exhaust line means further including:
aspirator means in said fluid exhaust line means connected in line between said pumping chambers and atmosphere for producing a vacuum as fluid flows in said fluid exhaust line means;
(vii) vacuum tank means including a vacuum tank connected to said aspirator means through a check valve for producing a vacuum for auxillary or system use; fluid passing through said fluid exhaust line means and said aspirator means producing the vacuum in said vacuum tank means for such future auxillary or system use; and
(viii) control means connected to said pumping chambers for controlling said inlet means, said outlet means, said fluid pressure head means and said fluid exhaust line means in proper sequence; whereby the material can be transferred from the vessel's cargo tank(s) without all the problems and hazards found in the transfer systems for marine vessels used in the prior art.

14. The marine vessel of claim 13 wherein said vacuum tank means includes a line to said pumping chambers for producing a vacuum in said pumping chambers for pulling the last of the material to be transferred into said pumping chambers.

15. The marine vessel of claim 13 wherein said vacuum tank means includes a line to an auxillary system for use in that system.

16. The marine vessel of claim 15 wherein said auxillary system is a bilge evacuating system including a system of piping into the bilges of the vessel connected to said vacuum tank, said vacuum tank means serving as a suction pump to said bilge evacuating system.

17. The method of transferring material in a liquid or slurry form from a marine vessel having at least one cargo tank comprising the following steps:
(a) providing a material transfer system connected to said cargo tank for transferring the material out of said cargo tank; said material transfer system comprising—
at least two pumping chambers;
a common discharge line for said pumping chambers;
material inlet means connected between said cargo tank and said pumping chambers for alternately filling said pumping chambers with the material to be transferred;
material outlet means connected between said pumping chambers and said common discharge line for alternately transferring the material from said pumping chambers to said common discharge line;
fluid pressure head means connected to said pumping chambers for supplying a pumping fluid pressure head to said pumping chambers for forcing the material out of said pumping chambers;
fluid exhaust line means connected to said pumping chambers for exhausting the pumping fluid pressure head from the pumping chambers after the material has been forced out of them, a line being provided between said exhaust line means and the cargo tank; and
control means connected to said pumping chambers for controlling said inlet means, said outlet means, said fluid pressure head means and said fluid exhaust line means in proper sequence.
(b) actuating said control means to sequentially and alternately open and close said material inlet means, said material outlet means, said fluid pressure head means and said fluid exhaust line means to transfer the material from the cargo tank through said pumping chambers and out said common discharge; whereby the material can be transferred from the vessel's cargo tank(s) under the action of said fluid pressure head without all the problems and hazards found in the transfer systems for marine vessels used in the prior art; and
(c) allowing the exhaust of the pumping fluid pressure head to be introduced into the cargo tank to increase the static pressure head in said cargo tank; whereby the rate of flow of the material is increased and complete emptying of the cargo tank is enhanced.

18. The method of claim 17 wherein in step (a) there is further provided vacuum tank means including a vacuum tank connected to said pumping chambers; and wherein in step (b) in transferring the material there is further included the step of—
opening said vacuum tank into said pumping chambers to produce a vacuum to pull in the material from the cargo tank into said pumping chambers.

19. The method of claim 17 wherein there is further included the step of—
heating said material inlet means to heat the material being transferred.

20. The method of transferring material in a liquid or slurry form from a marine vessel having at least one cargo tank comprising the following steps:

(a) providing a material transfer system connected to said cargo tank for transferring the material out of said cargo tank; said material transfer system comprising—
  at least two pumping chambers;
  a common discharge line for said pumping chambers;
  material inlet means connected between said cargo tank and said pumping chambers for alternately filling said pumping chambers with the material to be transferred;
  material outlet means connected between said pumping chambers and said common discharge line for alternately transferring the material from said pumping chambers to said common discharge line;
  fluid pressure head means connected to said pumping chambers for supplying a pumping fluid pressure head to said pumping chambers for forcing the material out of said pumping chambers;
  fluid exhaust line means connected to said pumping chambers for exhausting the pumping fluid pressure head from the pumping chambers after the material has been forced out of them;
  vacuum tank means and an aspirator being provided in said fluid exhaust line means; and
  control means connected to said pumping chambers for controlling said inlet means, said outlet means, said fluid pressure head means and said fluid exhaust line means in proper sequence;
(b) actuating said control means to sequentially and alternately open and close said material inlet means, said material outlet means, said fluid pressure head means and said fluid exhaust line means to transfer the material from the cargo tank through said pumping chambers and out said common discharge; whereby the material can be transferred from the vessel's cargo tank(s) under the action of said fluid pressure head without all the problems and hazards found in the transfer systems for marine vessels used in the prior art; and
(c) passing the exhausting fluid pressure head through said aspirator to produce a vacuum in said vacuum tank to thereby increase the vacuum therein while the fluid pressure head is being exhausted.

21. The method of claim 20 wherein there is further included the step of—
  using said vacuum tank as a suction pump for evacuating the bilges in the vessel.

22. The method of claim 20 wherein there is further included the steps of—
  cleaning out the cargo tank with a cleaning solution after the material has been transferred out of it; and
  using said vacuum tank for storing said cleaning solution.

* * * * *